June 15, 1926.
E. GREGG
STORAGE BATTERY
Filed Dec. 13, 1923
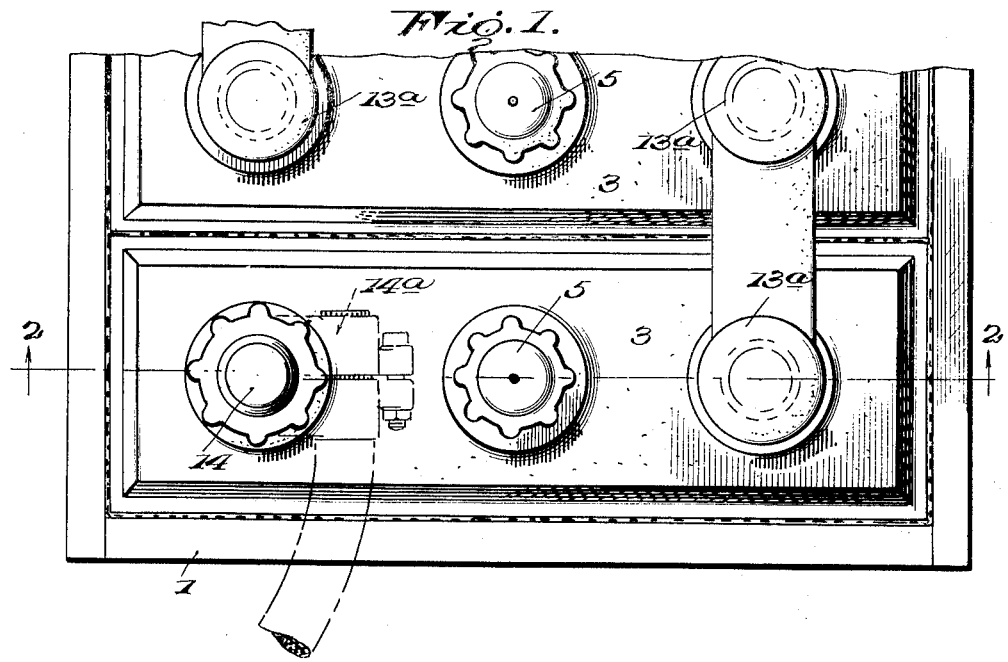
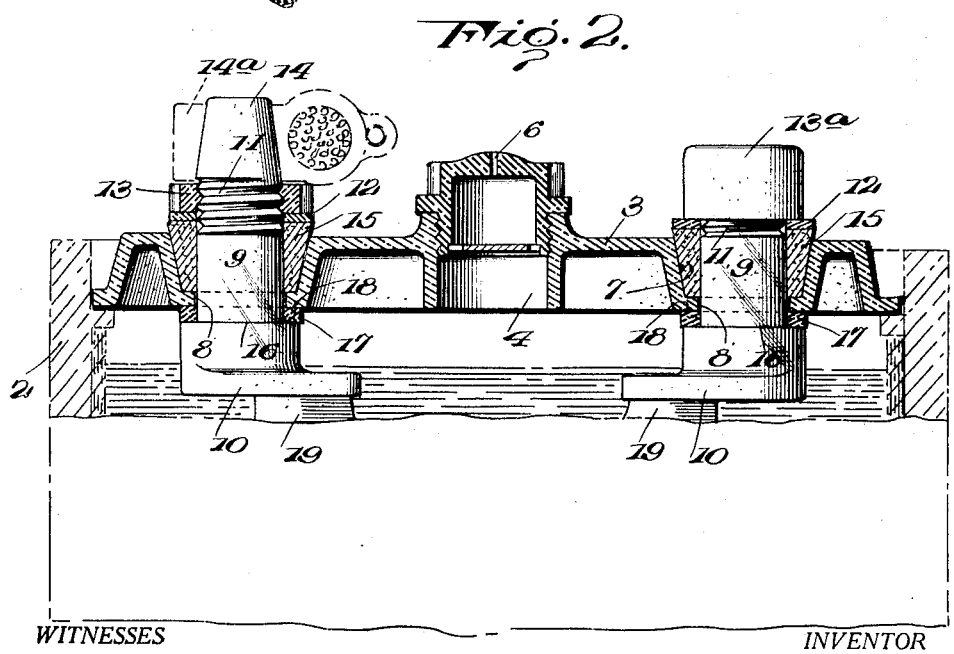
WITNESSES
INVENTOR
E. Gregg.
BY
ATTORNEYS Patented June 15, 1926.

1,588,959

UNITED STATES PATENT OFFICE

E. GREGG, OF CLAREMORE, OKLAHOMA.

STORAGE BATTERY.

Application filed December 13, 1923. Serial No. 680,550.

This invention relates to storage batteries and is more particularly directed to a seal for the terminals of batteries adapted for use on an automobile.

An object of the invention is the provision of a device for sealing a battery against loss of fluid at points where the terminals project through the top section of the battery and which seal acts as a resilient cushion to prevent breakage of the top during travel of the automobile to which the battery is applied.

A further object of the invention is the provision of an elastic compressible seal for the battery posts where said posts project through the shell of said battery and which seal will compensate for jars incident to road shocks to an automobile and thereby prevent fracture of the material of said top proximate to the passage of the post through the same.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a fragmentary view in plan of a battery showing my invention applied thereto.

Figure 2 is a transverse vertical section of a battery cell showing my invention applied thereto.

Referring more particularly to the drawings, a storage or secondary battery box is shown comprising a box or container 1 in which are located in juxtaposition a plurality of cells 2. A cover 3 formed of hard rubber or a composition used for the purpose, is adapted to be applied to the tops of each cell for closing the same. The periphery of the cover is sealed in the usual manner to the top of said cell to prevent loss of fluid from the cell.

The cover has a central opening or passage 4 having an internally threaded portion adapted to receive the external threads of a cap nut 5. A restricted passage 6 is provided in the cap nut 5 for the usual purpose. The cap nut 5 permits inspection of the interior of a cell and likewise permits refilling of the cell with distilled water when necessary.

The cover 3 is provided adjacent its opposite ends with inverted frusto-conically shaped pockets 7 and an opening 8 located in that portion of the material of the top which forms the bottom of said pocket.

A post 9 integrally formed with the pillar straps 10 is adapted to be inserted through the passage 8 and have its upwardly threaded end 11 adapted to receive a lead washer 12 and a lead nut 13. The outer projecting end 14 of the post 9 is adapted to receive the usual clamping element 14ª of the battery wire.

When a connector 13ª is employed between posts of the cell, the nut 13 may be omitted.

Located within the pockets 7 and having a central opening through which the post 9 is inserted is a frusto-conically shaped gasket 15 having its inner reduced end seated upon the bottom of the pocket 7 while its outer enlarged end is adapted to support the washer 12. When the nut 13 is screwed down upon washer 12 the compressible gasket 15 is forced into engagement with the walls of the pocket and the outer walls of the post 9 and seals this portion of the cover 3 against the loss of fluid.

It will be noted in Figure 2 that the upper end of the gasket 15 is adapted to project beyond the upper surface of the cover 3 even when the nut 13 is screwed to its lower limit so that the lead nut 13 and washer 12 will not at any time come in contact with the fragile material of the cover and thereby cause breakage of the same.

The inner end of the post 9 adjacent its connection with the pillar strap 10 is provided with a shoulder 16 upon which is mounted a rubber washer 17. The rubber washer 17 is adapted to be compressed between the shoulder 16 and the bottom 18 of the pocket 7 thereby cooperating with the gasket 15 for sealing the post against the loss of fluid.

The strap 10 is connected to the pillars 19 of the cells 2.

It will be seen by my construction that the cover 3 at the passage 8 is resiliently cushioned against fracture from the post 9 when the battery has been applied to an automobile and the same is constantly jarred due to shocks incident to road travel. Furthermore, the material of the gasket 15 and the washer 17 being compressible, is forced into close contact with the walls of the pocket 7, the inner face of the cover 3 and the outer wall of the post 9, so that the gasket and washer will form a seal against the loss of fluid at points where the post projects through the cover.

What I claim is:

1. In a storage battery cell, the combination of a cover having a depressed pocket and an aperture at the bottom of said pocket adapted to receive the post of a pillar strap, a compressible gasket in the pocket surrounding the post and projecting beyond the outer surface of the cover, a compressible washer on the post, said post being provided with a shoulder adapted to receive the washer, and means for locking the post to the cover and compressing the gasket and washer into sealing relation with the post and the opening in the cover.

2. In a storage battery cell, the combination of a cover having a frusto-conically shaped depressed pocket and an aperture at the bottom of said pocket adapted to receive the post of a pillar strap, a compressible gasket complementary in shape to the pocket, seated within said pocket and surrounding the post, the outer projecting end of the gasket being extended beyond the outer end of the pocket, a compressible washer on the post, said post being provided with a shoulder adapted to receive the washer, and means for locking the post to the cover and compressing the gasket and washer into sealing relation with the post and the opening in the cover.

E. GREGG.